US009911399B2

(12) United States Patent
Baek et al.

(10) Patent No.: US 9,911,399 B2
(45) Date of Patent: Mar. 6, 2018

(54) METHOD OF IMAGE PROCESSING, IMAGE PROCESSOR PERFORMING THE METHOD AND DISPLAY DEVICE HAVING THE IMAGE PROCESSOR

(71) Applicant: SAMSUNG DISPLAY CO., LTD., Yongin-si, Gyeonggi-do (KR)

(72) Inventors: Sung-Yeol Baek, Anyang-si (KR); Eun-Ho Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 218 days.

(21) Appl. No.: 14/996,375

(22) Filed: Jan. 15, 2016

(65) Prior Publication Data
US 2016/0379602 A1 Dec. 29, 2016

(30) Foreign Application Priority Data
Jun. 24, 2015 (KR) ........................ 10-2015-0089675

(51) Int. Cl.
*G06T 3/40* (2006.01)
*G09G 5/373* (2006.01)
(Continued)

(52) U.S. Cl.
CPC ........... *G09G 5/373* (2013.01); *G06T 3/4007* (2013.01); *G09G 3/2003* (2013.01);
(Continued)

(58) Field of Classification Search
None
See application file for complete search history.

(56) References Cited

U.S. PATENT DOCUMENTS

| 8,554,019 B2 * | 10/2013 | Yokoi | G06T 3/4007 |
| | | | 382/300 |
| 2002/0015162 A1 * | 2/2002 | Hoshii | G06T 3/4007 |
| | | | 358/1.2 |

(Continued)

FOREIGN PATENT DOCUMENTS

| KR | 1020140017465 A | 2/2014 |
| KR | 1020150020844 A | 2/2015 |

OTHER PUBLICATIONS

Gnanatheja Rakesh V, T Sreenivasulu Reddy; "YCoCg color Image Edge detection;" International Journal of Engineering Research and Applications (IJERA); vol. 2, Issue 2, Mar.-Apr. 2012, pp. 152-156.*

*Primary Examiner* — Edward Martello
(74) *Attorney, Agent, or Firm* — Cantor Colburn LLP

(57) ABSTRACT

A method of image processing includes determining a supplement pixel and original pixels adjacent to the supplement pixel, deriving luminance data of the original pixels from input image data, calculating a difference value among the luminance data of the original pixels, selecting an original pixel of the original pixels as an effective pixel when the difference value of luminance data of the original pixel and a nearest original pixel to the supplement pixel is smaller than a predetermined threshold value, setting a weighted value of the effective pixel based on a distance between the supplement pixel and the effective pixel, and calculating luminance data of the supplement pixel based on luminance data of the effective pixel and the weighted value.

20 Claims, 11 Drawing Sheets

(51) Int. Cl.
*G09G 5/02* (2006.01)
*G09G 5/10* (2006.01)
*G09G 3/20* (2006.01)

(52) U.S. Cl.
CPC ............. *G09G 3/2092* (2013.01); *G09G 5/02* (2013.01); *G09G 5/026* (2013.01); *G09G 5/10* (2013.01); *G09G 2300/0439* (2013.01); *G09G 2310/0267* (2013.01); *G09G 2310/0275* (2013.01); *G09G 2320/029* (2013.01); *G09G 2340/0407* (2013.01); *G09G 2340/06* (2013.01); *G09G 2360/16* (2013.01)

(56) References Cited

U.S. PATENT DOCUMENTS

| | | | |
|---|---|---|---|
| 2005/0243109 A1* | 11/2005 | Stevens | G06T 3/4007 345/694 |
| 2009/0279609 A1 | 11/2009 | De Haan et al. | |
| 2009/0324136 A1 | 12/2009 | Yamada et al. | |
| 2014/0022240 A1 | 1/2014 | Lee et al. | |
| 2014/0111532 A1* | 4/2014 | Manchi | G06T 3/4007 345/582 |
| 2014/0362116 A1 | 12/2014 | Park et al. | |

* cited by examiner

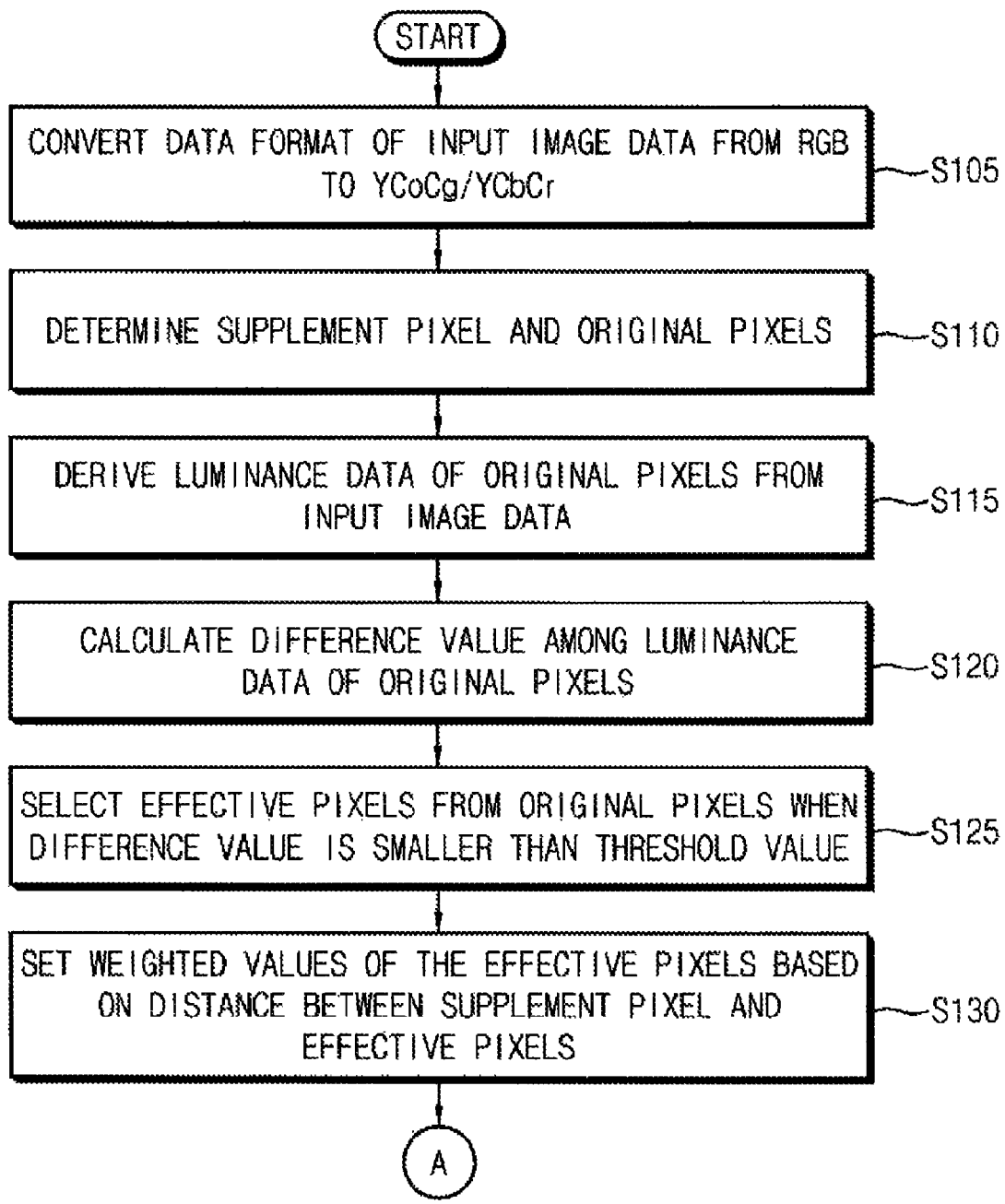

METHOD OF IMAGE PROCESSING, IMAGE PROCESSOR PERFORMING THE METHOD AND DISPLAY DEVICE HAVING THE IMAGE PROCESSOR

This application claims priority to Korean patent Application No. 10-2015-0089675, filed on Jun. 24, 2015, and all the benefits accruing therefrom under 35 U.S.C. § 119, the content of which in its entirety is herein incorporated by reference.

BACKGROUND

1. Technical Field

Exemplary embodiments of the inventive concept relate to display devices. More particularly, exemplary embodiments of the inventive concept relate to a method of image processing, an image processor that performs the method and a display device including the image processor.

2. Description of the Related Art

As the resolution of display devices becomes higher, it is desired to display a low-resolution image in high-resolution display devices. The high-resolution display device may display a low-resolution image using a scaler converting a low-resolution image data to a high-resolution image data. For example, the High Definition ("HD" 1,920×1,080) display device displays a Standard Definition ("SD", 720×480) image using an image processor having an HD scaler.

Generally, when the display device scales an image using the scaler, an image quality problem such as blurred edges, jagged edges, may occur. Accordingly, a variety of scaling algorithms have been developed to improve the blur or jaggy phenomenon. However, conventional scaling algorithms typically use a large amount of line memory.

SUMMARY

Exemplary embodiments provide a method of image processing with improved display quality and reduced line memory usage.

Exemplary embodiments provide an image processor that performs the method of image processing.

Exemplary embodiments provide a display device including the image processor.

According to an exemplary embodiment, a method of image processing may include determining a supplement pixel of which data is generated by scaling input image data and a plurality of original pixels of which data correspond to the input image data, where the original pixels are adjacent to the supplement pixel, deriving luminance data of the original pixels from the input image data, calculating a difference value among the luminance data of the original pixels, selecting an original pixel among the original pixels as an effective pixel when a difference value of luminance data of the original pixel and a nearest original pixel to the supplement pixel among the original pixels is smaller than a predetermined threshold value, setting a weighted value of the effective pixel based on a distance between the supplement pixel and the effective pixel, and calculating luminance data of the supplement pixel based on luminance data of the effective pixel and the weighted value.

In an exemplary embodiment, the weighted value may be determined in inverse proportion to the distance between the supplement pixel and the effective pixel.

In an exemplary embodiment, a sum of the weighted value may be 1.

In an exemplary embodiment, the luminance data of the supplement pixel may be determined as a weighted average of the luminance data of the effective pixel based on the weighted value.

In an exemplary embodiment, the method of image processing may further include converting a data format of the input image data from a RGB format to a converted image format in which luminance data and chrominance data are separated from each other.

In an exemplary embodiment, the converted image format may be YCoCg format or YCbCr format.

In an exemplary embodiment, the method of image processing may further include deriving chrominance data of the original pixels from the input image data, and calculating chrominance data of the supplement pixel based on the chrominance data of the original pixels.

In an exemplary embodiment, the chrominance data of the supplement pixel may be calculated by a bilinear interpolation manner using the chrominance data of the original pixels.

In an exemplary embodiment, the chrominance data of the supplement pixel may be determined as chrominance data of the nearest original pixel to the supplement pixel among the original pixels.

In an exemplary embodiment, the method of image processing may further include operation of converting a data format of image data of the supplement pixel from the converted image format to the RGB format to generate output image data.

In an exemplary embodiment, the method of image processing may further include operation of deriving estimate luminance data of the supplement pixel based on the luminance data of the original pixels. The luminance data of the supplement pixel may be determined as a value in a range from a weighted average of the luminance data of the effective pixel based on the weighted values to the estimate luminance data.

In an exemplary embodiment, the estimate luminance data may be calculated by a bilinear interpolation manner using the luminance data of the original pixels.

In an exemplary embodiment, the estimate luminance data may be determined as luminance data of the nearest original pixel to the supplement pixel among the original pixels.

According to another exemplary embodiment, an image processor may include an effective pixel determiner which determines a supplement pixel of which data is generated by scaling input image data and a plurality of original pixels of which data correspond to the input image data, where the original pixels are adjacent to the supplement pixel, and the effective pixel determiner selects an original pixel among the original pixels as an effective pixel when a difference value of luminance data of the original pixel and a nearest original pixel to the supplement pixel among the original pixels is smaller than a predetermined threshold value, a weighted value calculator which sets a weighted value of the effective pixel in inverse proportion to a distance between the supplement pixel and the effective pixel, and a data calculator which calculates luminance data of the supplement pixel based on the luminance data of the effective pixel and the weighted value.

In an exemplary embodiment, the image processor may further include a first format converter which converts a data format of the input image data from a RGB format to a converted image format in which luminance data and chrominance data are separated, and a second format converter which converts a data format of image data of the supplement pixel from the converted image format to the RGB format.

In an exemplary embodiment, the data calculator may calculate the luminance data of the supplement pixel as a weighted average of the luminance data of the effective pixel based on the weighted value.

In an exemplary embodiment, the data calculator may calculate the chrominance data of the supplement pixel by a bilinear interpolation manner using the chrominance data of the original pixels.

In an exemplary embodiment, the image processor may further include a data estimator which derives estimate luminance data of the supplement pixel based on the luminance data of the original pixels. In such an embodiment, the data calculator may determine the luminance data of the supplement pixel as a value in a range from a weighted average of the luminance data of the effective pixel based on the weighted value to the estimate luminance data.

In an exemplary embodiment, the converted image format may be YCoCg format or YCbCr format.

According to another exemplary embodiment, a display device may include a display panel including a plurality of pixels, a scan driver which provides a scan signal to the pixels, a data driver which provides a data signal to the pixels, an image processor which generates output image data by scaling input image data, and a controller which controls the scan driver and the data driver to display an image corresponding to the output image data. In such an embodiment, the image processor may include an effective pixel determiner which determines a supplement pixel of which data is generated by scaling the input image data and a plurality of original pixels of which data correspond to the input image data, where the original pixels are adjacent to the supplement pixel, and the effective pixel determiner selects an original pixel among the original pixel as an effective pixel when a difference value of luminance data of the original pixel and a nearest original pixel to the supplement pixel among the original pixels is smaller than a predetermined threshold value, a weighted value calculator which sets a weighted value of the effective pixel in inverse proportion to a distance between the supplement pixel and the effective pixel, and a data calculator which calculates luminance data of the supplement pixel based on the luminance data of the effective pixel and the weighted value.

In such an embodiment of a method of image processing, an original pixel among original pixels adjacent to a supplement pixel may be selected as an effective pixel when a difference value of luminance data of the original pixel and the nearest original pixel is smaller than a predetermined threshold value. In such an embodiment of the method of image processing, weighted values of the effective pixels may be calculated based on a distance between the supplement pixel and the effective pixels, and data of the supplement pixel may be calculated based on data of the effective pixels and the weighted values. Accordingly, the method of image processing may improve the display quality and reduce the line memory usage.

According to exemplary embodiments of the invention, an image processor may increase the sharpness of image and improve the jaggy phenomenon using minimum line memory by performing the method of image processing.

According to exemplary embodiments of the invention, a display device may have reduced hardware resource usage and the manufacturing cost thereof may be reduced by including the image processor.

BRIEF DESCRIPTION OF THE DRAWINGS

Exemplary embodiments will be described more fully hereinafter with reference to the accompanying drawings, in which various embodiments are shown.

FIGS. 1A and 1B are flow charts illustrating an exemplary embodiment a method of image processing according to the invention.

DETAILED DESCRIPTION

Figure 1B:
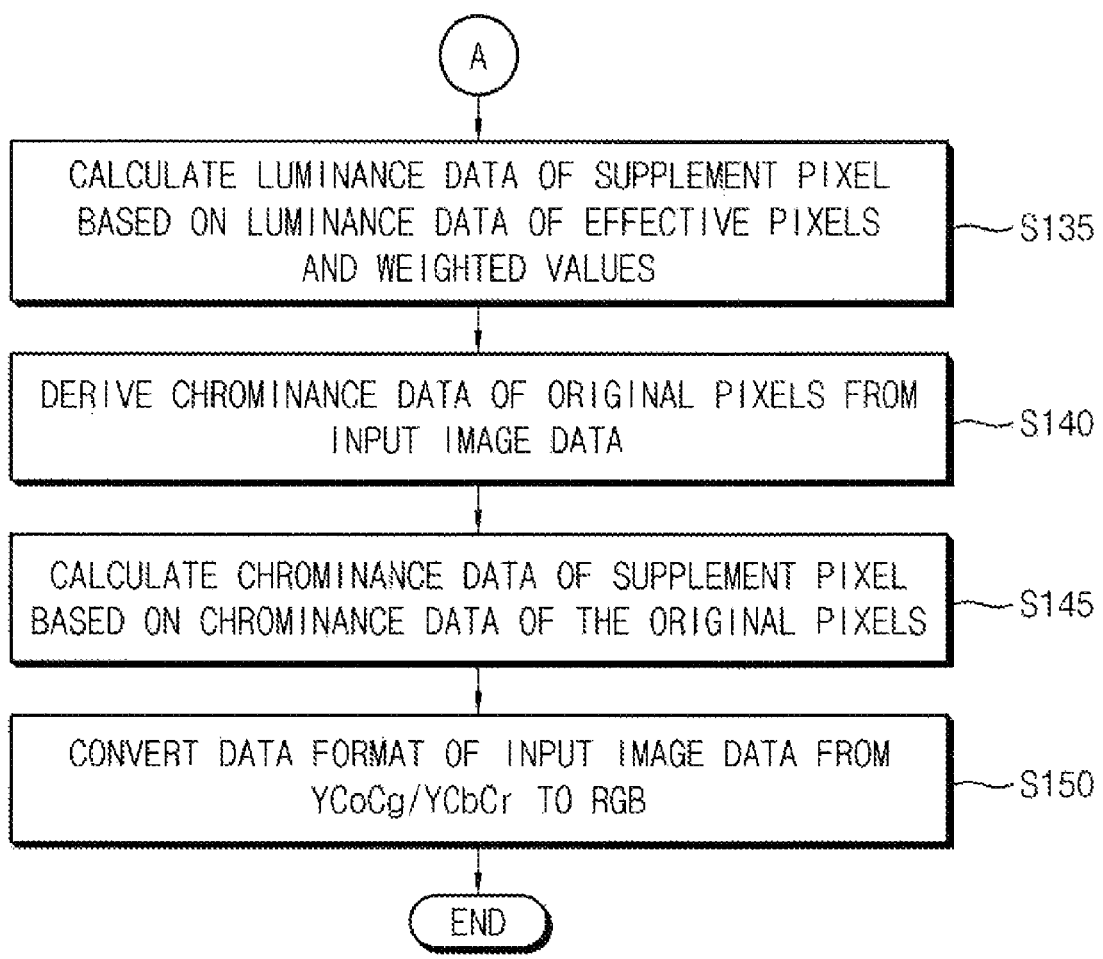

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments will be described more fully hereinafter with reference to the accompanying drawings, in which various embodiments are shown.

FIGS. 1A and 1B are flow charts illustrating an exemplary embodiment a method of image processing, according to the invention.

Referring to FIGS. 1A and 1B, an exemplary embodiment of the method of image processing may include selecting effective pixels among original pixels adjacent to a supplement pixel when a difference value among luminance data of the original pixels is smaller than a predetermined threshold value. The method of image processing may further include calculating weighted values of the effective pixels. The method of image processing may further include calculating data of the supplement pixel based on data of the effective pixels and the weighted values to scale image data.

In an exemplary embodiment, a data format of input image data may be converted from a RGB format to a converted image format (S105). Here, the converted image format allows luminance data and chrominance data to be separated from each other. In one exemplary embodiment, the converted image format may be YCoCg format or YCbCr format. The YCoCg format includes luminance data (Y), chrominance orange (Co), and chrominance green (Cg). The YCbCr format includes luminance data (Y), chrominance blue (Cb), and chrominance red (Cr). The YCoCg format has characteristics such as simple and fast calculation in comparison with the YCbCr format.

In an exemplary embodiment, a supplement pixel and a plurality of original pixels may be determined (S110). In such an embodiment, data of the original pixels corresponds to the input image data. Data of the supplement pixel are generated by scaling the input image data. Thus, the supplement pixel of which data is generated by scaling input image data and the original pixels of which data correspond to the input image data may be determined. In such an embodiment, locations of the supplement pixel and the original pixels adjacent to the supplement pixel may be determined to calculate a distance between the supplement pixel and the original pixel.

Luminance data of the original pixels may be derived from the input image data (S115). When the data format of the input image data is converted from the RGB format to the converted image format, the luminance data of the original pixel may be derived without additional operation.

A difference value among the luminance data of the original pixels may be calculated (S120), and effective pixels may be selected from the original pixels when the difference value is smaller than a predetermined threshold value (S125). In an exemplary embodiment, an original pixel among the original pixels as an effective pixel when a difference value of luminance data of the original pixel and a nearest original pixel to the supplement pixel among the original pixels is smaller than the predetermined threshold value. When the difference value between the luminance data of the original pixels is relatively large, the original pixels may be located at the border of the image. The blur phenomenon may occur when the input image data are scaled using the original pixels that are located in different image region based on the border of the image. Therefore, the sharpness of the image may be improved by selecting an original pixel as an effective pixel when the difference value of the luminance data of the original pixel and the nearest original pixel is smaller than the threshold value. When the threshold value is relatively small, data of the supplement pixel is similar to data of the original pixel that is nearest to the supplement pixel (i.e., nearest algorithm) because the small number of the original pixels are selected as the effective pixels.

Weighted value of the effective pixel may be set based on a distance between the supplement pixel and the effective pixel (S130). In one exemplary embodiment, for example, the weighted value may be determined in inverse proportion to the distance between the supplement pixel and the effective pixel. In such an embodiment, when a distance between the effective pixel and the supplement pixel is relatively close, the effective pixel has a relatively large weighted value. In such an embodiment, when a distance between the effective pixel and the supplement pixel is relatively far, the effective pixel has a relatively small weighted value. In such an embodiment, a sum of the weighted value is 1 to set luminance data of the supplement pixel to a weighted average of the luminance data of the effective pixel.

Luminance data of the supplement pixel may be calculated based on luminance data of the effective pixel and the weighted value (S135). In one exemplary embodiment, for example, the luminance data of the supplement pixel may be calculated as a weighted average using the luminance data of the effective pixel and the weighted value. The luminance data of the supplement pixel may be set in a way such that the supplement pixel is highly affected by an effective pixel relatively near to the supplement pixel.

Chrominance data of the original pixels may be derived from the input image data (S140), and chrominance data of the supplement pixel may be calculated based on the chrominance data of the original pixels (S145). When the data format of the input image data is converted from the RGB format to the converted image format, the luminance data of the original pixel may be derived without additional operation. Generally, variation of chrominance data is less recognized by user than variation of luminance data. Therefore, in an exemplary embodiment, the chrominance data of the supplement pixel may be calculated using a simple algorithm to reduce load of the image processor. In one exemplary embodiment, for example, the chrominance data of the supplement pixel may be calculated by a bilinear interpolation manner using the chrominance data of the original pixels. When the chrominance data of the supplement pixel are calculated by the bilinear interpolation, jaggy phenomenon appearing in a border of image may be improved. In an alternative exemplary embodiment, the chrominance data of the supplement pixel may be determined as chrominance data of the nearest original pixel to the supplement pixel among the original pixels. When the chrominance data of the supplement pixel is determined as the chrominance data of the nearest original pixel to the supplement pixel, load of the image processor may be reduced.

A data format of image data (e.g., data including the luminance data and the chrominance data) of the supplement pixel may be converted from the converted image format to the RGB format to generate output image data (S150). In an exemplary embodiment, the data format of the supplement pixel may be converted from the converted image format to the RGB format to output the output image data of which data format is the RGB format and to display the image corresponding to the output image data.

Therefore, the effective pixels may be selected from the original pixels adjacent the supplement pixel by the method, thereby scaling image data using two line memories and improving the display quality.

FIGS. 2A through 2D are diagrams illustrating an exemplary embodiment of calculating luminance data of a supplement pixel in a method of FIGS. 1A and 1B.

Referring to FIGS. 2A through 2D, in an exemplary embodiment, effective pixels may be selected among original pixels adjacent to a supplement pixel, and luminance data of the supplement pixel may be calculated based on luminance data of the effective pixels.

Figure 2A:
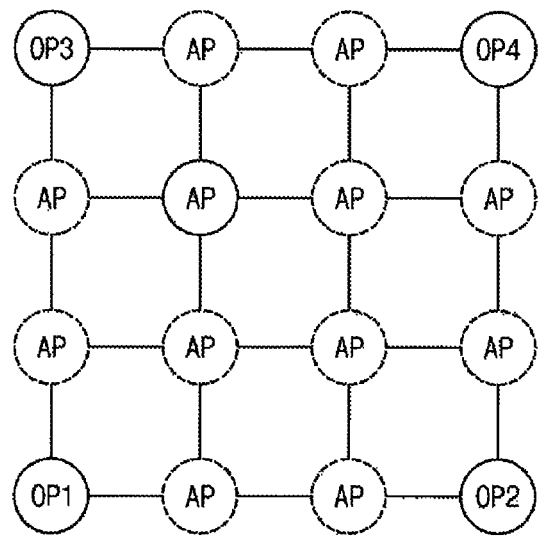
FIGS. 2A through 2D are diagrams illustrating an exemplary embodiment of calculating luminance data of a supplement pixel in a method of FIGS. 1A and 1B.

As shown in FIG. 2A, supplement pixels AP and original pixels OP1 through OP4 may be determined. When a resolution of input image data is lower than a resolution of a display device, output image data corresponding to the resolution of the display device may be generated by scaling the input image data. Thus, data of the original pixels OP1 through OP4 may correspond to the input image data, and data of the supplement pixels AP may be generated by scaling the input image data. In such an embodiment, locations of the supplement pixel and the original pixel adjacent to the supplement pixel may be determined to calculate a distance between the supplement pixel and the original pixel adjacent to the supplement pixel. In one exemplary embodiment, for example, a coordinate of the first original pixel OP1 may be determined as (0, 0), a coordinate of the second original pixel OP2 may be determined as (1, 0), a coordinate of the third original pixel OP3 may be determined as (0, 1), and a coordinate of the fourth original pixel OP4 may be determined as (1, 1), to simplify the calculation of the distance between the supplement pixel AP and the first through fourth original pixels OP1 through OP4.

Figure 2B:
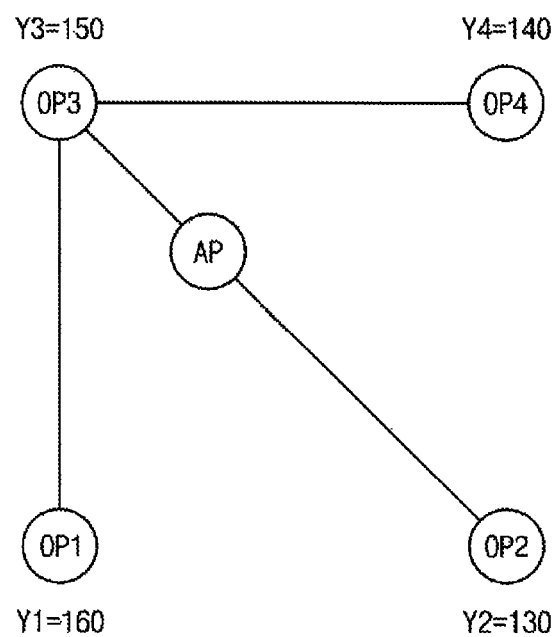

As shown in FIG. 2B, to calculate the luminance data of the supplement pixel AP, a difference value among the luminance data of the original pixels may be calculated, and the effective pixels may be selected among the original pixels when the difference value is smaller than a predetermined threshold value. Herein, the threshold value may be greater than zero (0). In an exemplary embodiment, an original pixel may be determined as an effective pixel when the difference value of luminance (e.g., an absolute value corresponding to luminance difference) of the original pixel and a nearest original pixel to the supplement pixel among the original pixels is smaller than a predetermined threshold value. In such an embodiment, the nearest original pixel, of which the difference value of luminance is zero (0) may be set as an effectively pixel. In one exemplary embodiment, for example, to calculate the luminance of the supplement pixel AP that is located at coordinates (1/3, 2/3), difference values between luminance data of the first through fourth original pixels OP1 through OP4 adjacent to the supplement pixel AP may be calculated and the difference values may be compared with the threshold value, e.g., a value of 15. In such an embodiment, an original pixel that is nearest to the supplement pixel among the original pixels is set as an effective pixel, and whether each of the remaining pixels is an effective pixel or not is determined based on a difference value between the nearest original pixel and each of the remaining pixels. In an exemplary embodiment, as shown in FIG. 2B, the third original pixel OP3 is the nearest original pixel of the supplement pixel AP at the coordinate of (1/3, 2/3), such that the third original pixel OP3 is an effective pixel of the supplement pixel AP. When a first luminance data Y1 of the first original pixel OP1 is 160 and a third luminance data Y3 of the third original pixel OP3 is 150, a difference value between the first luminance data Y1 and the third luminance data Y3 is 10. Because the difference value between the first luminance data Y1 and the third luminance data Y3 is smaller than the threshold value of 15, the first original pixel OP1 may be selected as an effective pixel. When a second luminance data Y2 of the second original pixel OP2 is 130 and the third luminance data Y3 of the third original pixel OP3 is 150, a difference value between the second luminance data Y2 and the third luminance data Y3 is 20. Because the difference value between the second luminance data Y2 and the third luminance data Y3 is greater than the threshold value of 15, the second original pixel OP2 may not be selected as an effective pixel. When a third luminance data Y3 of the third original pixel OP3 is 150 and the fourth luminance data Y4 of the fourth original pixel OP4 is 140, a difference value between the third luminance data Y3 and the fourth luminance data Y4 is 10. Because the difference value between the third luminance data Y3 and the fourth luminance data Y4 is smaller than the threshold value of 15, the fourth original pixel OP4 may be selected as an effective pixel. Therefore, effective pixels for the supplement pixel located at coordinates (1/3, 2/3) are the first original pixel OP1, the third original pixel OP3 and the fourth original pixel OP4.

Figure 2C:
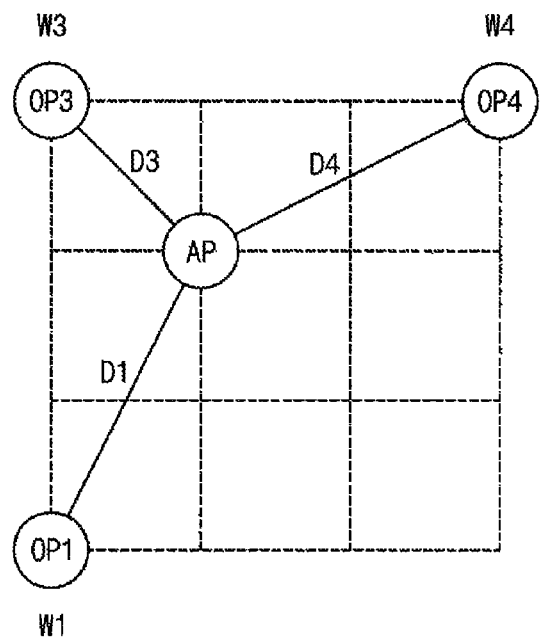

As shown in FIG. 2C, a weighted value of an effective pixel may be set based on a distance between the supplement pixel AP and the effective pixel. The weighted value may be determined in inverse proportion to the distance between the supplement pixel AP and the effective pixel. Accordingly, an effective pixel that is relatively near to the supplement pixel AP may have a relatively large weighted value. In one exemplary embodiment, for example, a first weighted value W1 of the first original pixel OP1 may be inversely proportional to a first distance D1 between the first original pixel OP1 and the supplement pixel AP. A third weighted value W3 of the third original pixel OP3 may be inversely proportional to a third distance D3 between the third original pixel OP3 and the supplement pixel AP. A fourth weighted value W4 of the fourth original pixel OP4 may be inversely proportional to a fourth distance D4 between the fourth original pixel OP4 and the supplement pixel AP. Therefore, the first weighted value W1 is substantially the same as the fourth weighted value W4, and the third weighted value W3 is greater than the first weighted value W1 and the fourth weighted value W4.

The weighted value may be calculated according to the following Equation 1:

$$W'k = \frac{1}{\sqrt{(Xk - Xa)^2 + (Yk - Ya)^2}} \qquad \text{[Equation 1]}$$

In Equation 1, W'k denotes the weighted value of the (k)th original pixel, Xk denotes x-coordinate of the (k)th original pixel, Xa denotes x-coordinate of the supplement pixel, Yk denotes y-coordinate of the (k)th original pixel, and Ya denotes y-coordinate of the supplement pixel.

In such an embodiment, a sum of the weighted value is 1 to set luminance data of the supplement pixel to a weighted average of the luminance data of the effective pixels. Therefore, the weighted value may be recalculated according to the following Equation 2:

$$Wk = \frac{W'k}{\sum W'i} \qquad \text{[Equation 2]}$$

In Equation 2, Wk denotes a recalculated weighted value of the (k)th original pixel, and W'k denotes the weighted value of the (k)th original pixel.

Figure 2D:
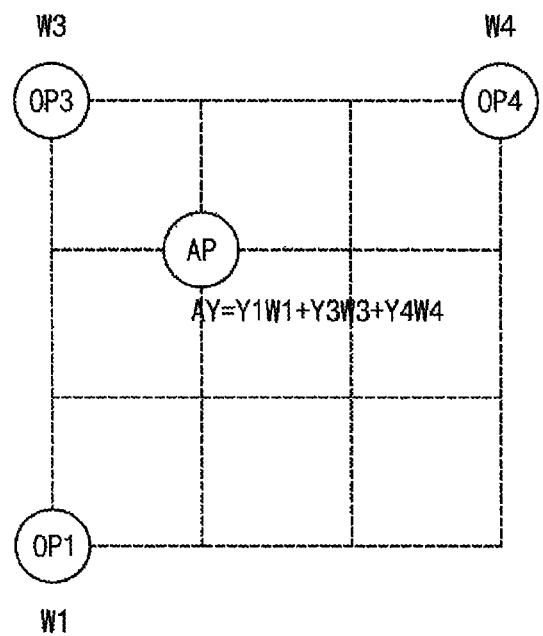

As shown in FIG. 2D, luminance data of the supplement pixel AP may be calculated based on the luminance data of the effective pixel and the weighted value. The luminance data of the supplement pixel AP may be calculated as a weighted average using the luminance data of the effective pixel and the weighted value. In one exemplary embodiment, for example, the luminance data of the supplement pixel AP may be calculated as the sum of the first luminance data Y1 multiplied by the first weighted value W1, the third luminance data Y3 multiplied by the third weighted value W3, and the fourth luminance data Y4 multiplied by the fourth weighted value W4.

The luminance data of the supplement pixel may be calculated according to the following Equation 3:

$$AY = \sum_{i}^{valid\ pixel} YiWi \qquad \text{[Equation 3]}$$

In Equation 3, AY denotes the luminance data of the supplement pixel, Yi denotes the luminance data of the effective pixel, and Wi denotes the weighted value of the effective pixel.

Therefore, the luminance data of the supplement pixel may be calculated using only effective pixels among the original pixels adjacent to the supplement pixel. In such an embodiment, the luminance data of the supplement pixel AP may be set in a way such that the supplement pixel is more affected by an effective pixel relatively near to the supplement pixel AP.

Figure 3:
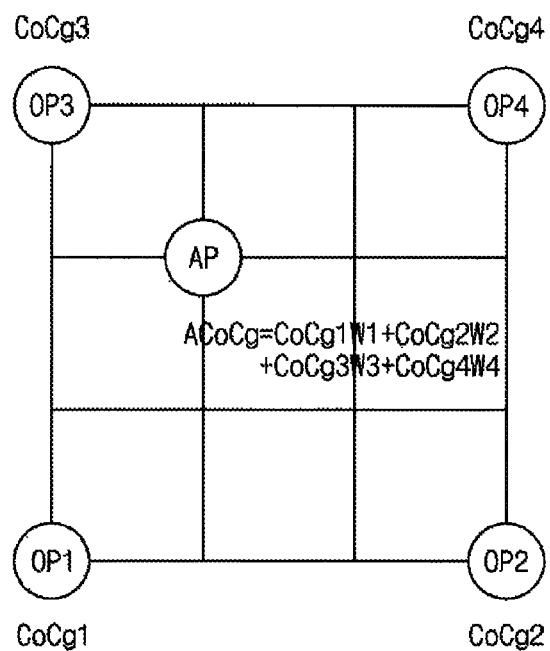
FIG. 3 is a diagram illustrating an exemplary embodiment of calculating chrominance data of a supplement pixel in a method of FIGS. 1A and 1B.

FIG. 3 is a diagram illustrating an exemplary embodiment of calculating chrominance data of a supplement pixel in a method of FIGS. 1A and 1B.

Referring to FIG. 3, in an exemplary embodiment, chrominance data of the original pixels may be derived from the input image data, and chrominance data of a supplement pixel AP may be calculated based on the chrominance data of the original pixels adjacent to the supplement pixel AP. Generally, variation of chrominance data is less recognized by a user than variation of luminance data. Therefore, the chrominance data of the supplement pixel AP may be calculated using a simple algorithm to reduce load of the image processor. In one exemplary embodiment, for example, the chrominance data ACoCg of the supplement pixel AP may be calculated by a bilinear interpolation using the chrominance data of the original pixels. The chrominance data ACoCg of the supplement pixel AP may be calculated as a weighted average using chrominance data CoCg1 through CoCg4 of the first through original pixels OP1 through OP4 adjacent to the supplement pixel AP and the weighted values W1 through W4. Therefore, the chrominance data ACoCg of the supplement pixel AP may be calculated according to the following Equation 4:

$$ACoCg = \sum_{i}^{original\ pixel} CoCgiWi \qquad \text{[Equation 4]}$$

In Equation, ACoCg denotes the chrominance data of the supplement pixel, CoCgi denotes the chrominance data of the original pixel, and Wi denotes the weighted value of the original pixel.

Figure 4A:
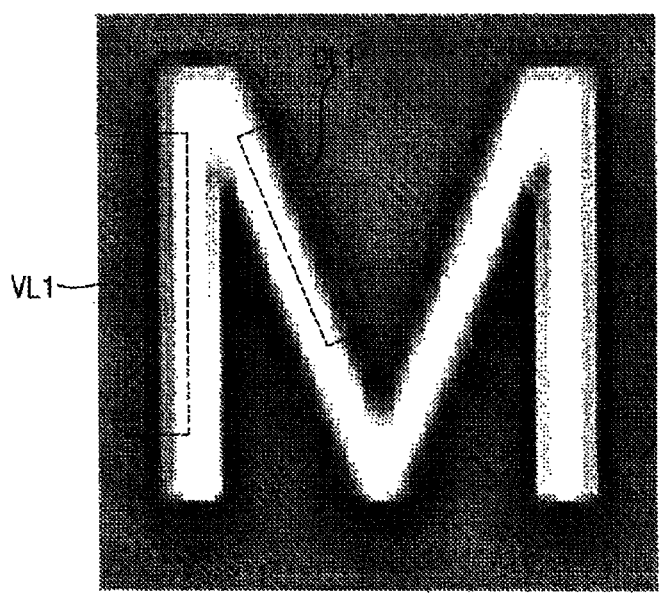
FIGS. 4A through 4C are images showing an effect of a method of FIGS. 1A and 1B.
Figure 4B:
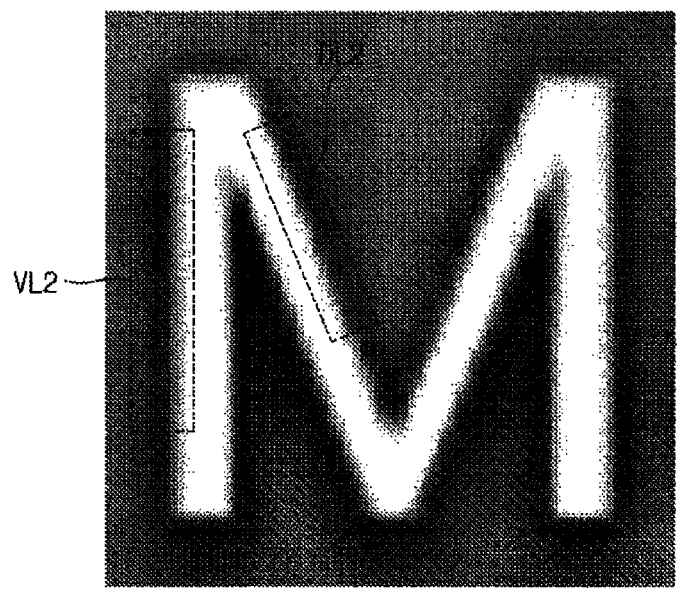
Figure 4C:
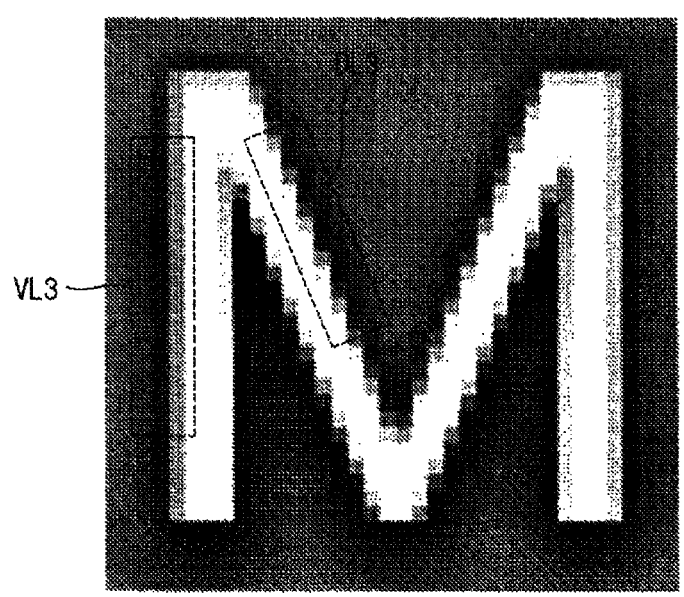

FIGS. 4A through 4C are images showing an effect of a method of FIGS. 1A and 1B.

Referring to FIGS. 4A through 4C, an exemplary embodiment of the method of image processing may improve the blur or jaggy phenomenon.

FIG. 4A shows an image displayed by an exemplary embodiment of the method of image processing based on effective pixels selected among original pixels adjacent to a supplement pixel. In such an embodiment, a difference value among luminance data of the original pixels was smaller than a predetermined threshold value. In such an embodiment, as described above, weighted value of the effective pixel is calculated based on the distance between the supplement pixel and the effective pixel, and the luminance data of the supplement pixel is calculated based on luminance data of the effective pixel and the weighted value. In such an embodiment, as shown in FIG. 4A, a border of a first vertical line VL1 is displayed with one grayscale, thereby improving the blur phenomenon. As shown in FIG. 4A, a border of a first diagonal line DL1 is displayed with a plurality of grayscales, thereby improving the jaggy phenomenon.

FIG. 4B shows an image displayed by a conventional method, of image processing by which luminance data of the supplement pixel is calculated by a bilinear interpolation manner using luminance data of the original pixels. In this case, luminance data of the supplement pixel is determined based on all of the original pixels adjacent to the supplement pixel. As shown in FIG. 4B, the blur phenomenon may appear in a border of a second vertical line VL2 and a border of a second diagonal line DL2 when an image is display by such a method.

FIG. 4C shows an image displayed by another conventional method of image processing, by which luminance data of the supplement pixel is determined as luminance data of an original pixel that is nearest to the supplement pixel. In this case, luminance data of the supplement pixel is determined as luminance data of the nearest original pixel to the supplement pixel among original pixels. As shown in FIG. 4C, the jaggy phenomenon may appear in a border of a third diagonal line DL3 when an image is display by such a method.

As shown in FIGS. 4A to 4C, an exemplary embodiment of the method of image processing may effectively improve the display quality using minimum line memories.

Figure 5A:
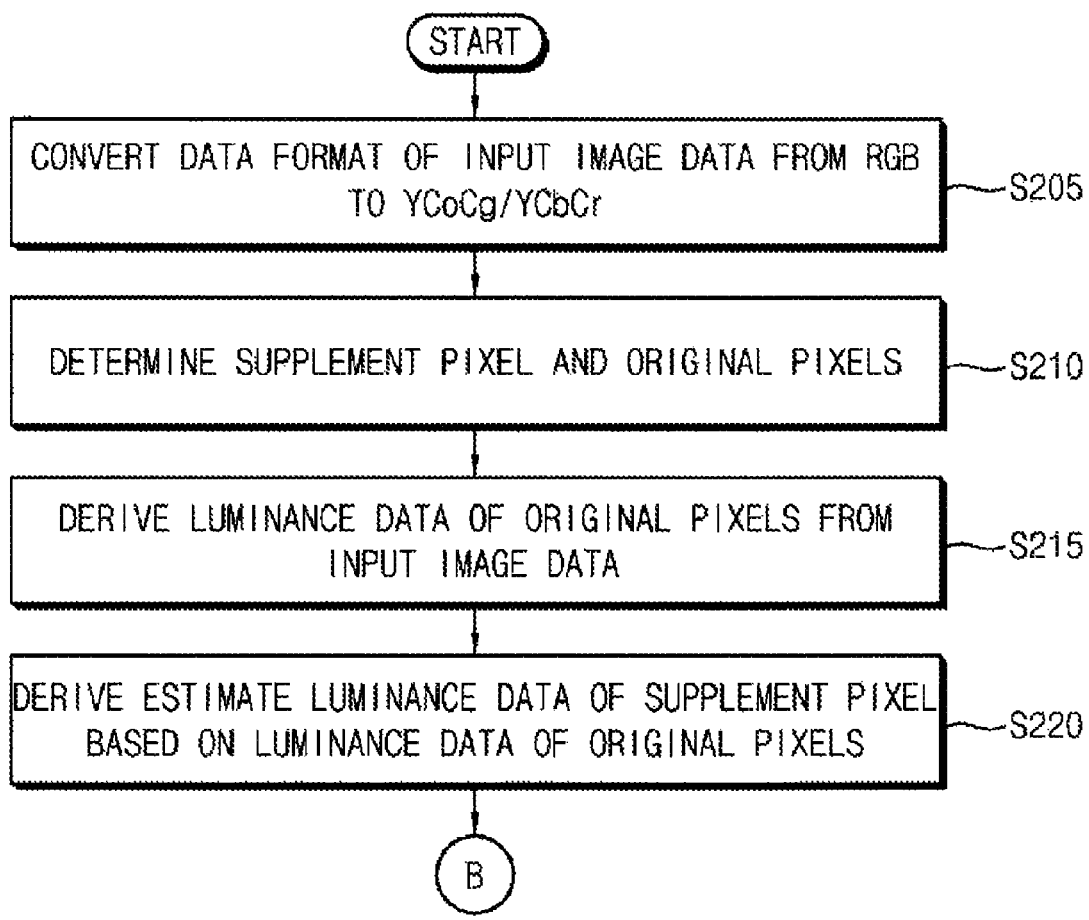
FIGS. 5A and 5B are flow charts illustrating an exemplary embodiment of a method of image processing according to the invention.
Figure 5B:
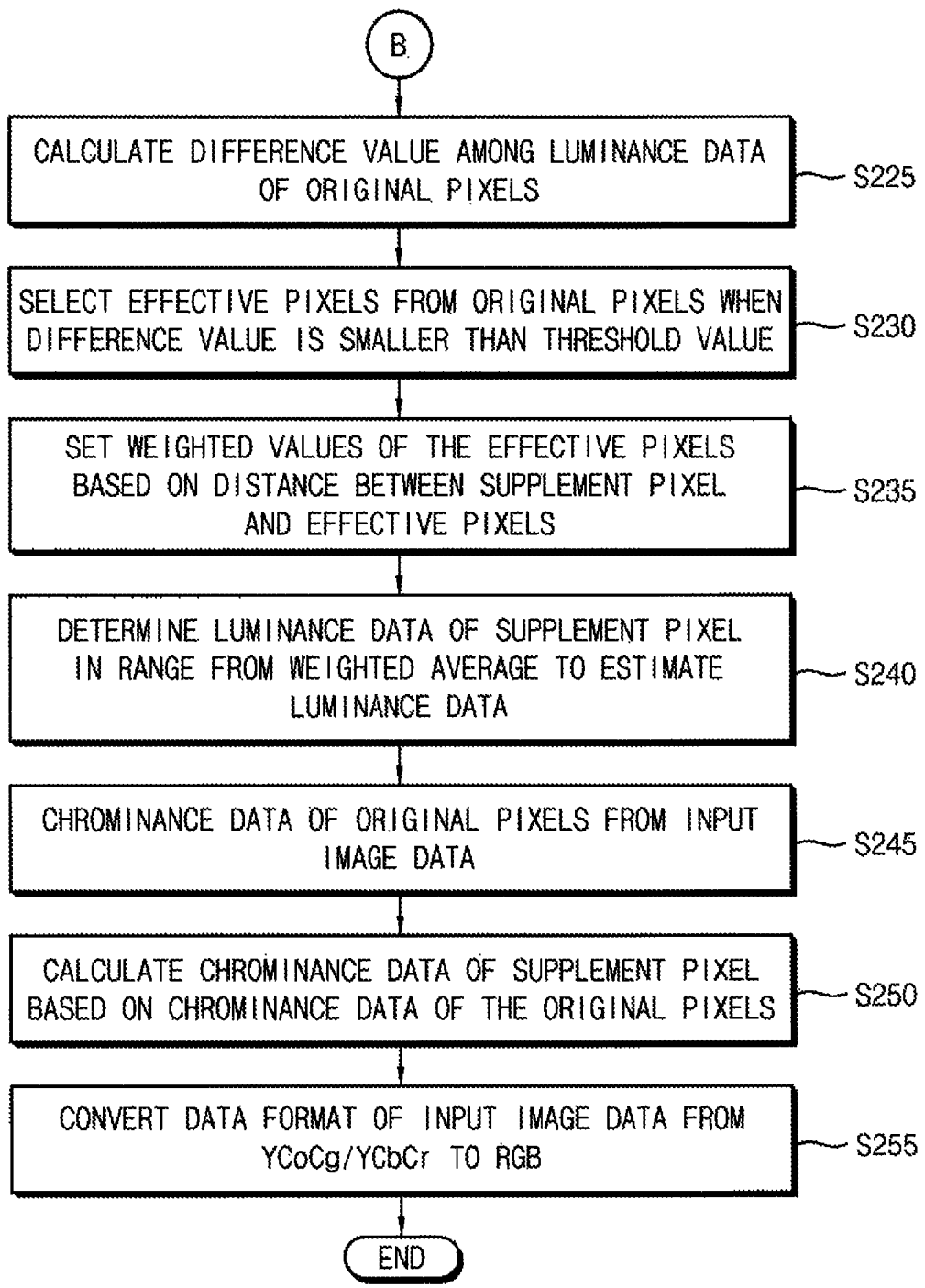

FIGS. 5A and 5B are flow charts illustrating an alternative exemplary embodiment a method of image processing according to the invention.

Referring to FIGS. 5A and 5B, in an exemplary embodiment of the method of image processing, effective pixels may be selected among original pixels adjacent to a supplement pixel when a difference value among luminance data of the original pixels is smaller than a predetermined threshold value. In such an embodiment, weighted values of the effective pixels may be calculated, and data of the supplement pixel may be calculated based on data of the effective pixels and the weighted values to scale image data. Such an embodiment of the method of image processing shown in FIGS. 5A and 5B is substantially the same as the exemplary embodiment of the method of image processing described above with reference to FIGS. 1A and 1B, except that an operation of deriving estimate luminance data is added. Therefore, any repetitive detailed description of the same or like elements shown in FIGS. 1A and 1B will be omitted or simplified.

In an exemplary embodiment, a data format of input image data may be converted from a RGB format to a converted image format (S205). A supplement pixel and a plurality of original pixels may be determined (S210). Luminance data of the original pixels may be derived from the input image data (S215).

Estimate luminance data of the supplement pixel may be derived based on the luminance data of the original pixels (S220). Accordingly, the estimate luminance data may be used for calculating luminance data of the supplement pixel. The estimate luminance data may be calculated using a simple algorithm. In one exemplary embodiment, for example, the estimate luminance data may be calculated by a bilinear interpolation manner using the luminance data of the original pixels. In an alternative exemplary embodiment, the estimate luminance data may be determined as luminance data of the nearest original pixel to the supplement pixel among the original pixels.

A difference value among the luminance data of the original pixels may be calculated (S225), and effective pixels may be selected from the original pixels when the difference value is smaller than a predetermined threshold value (S230). Weighted values of the effective pixels may be set based on a distance between the supplement pixel and the effective pixels (S235).

The luminance data of the supplement pixel may be determined as a value in a range from a weighted average of the luminance data of the effective pixel based on the weighted value to the estimate luminance data (S240). In one exemplary embodiment, for example, the luminance data of the supplement pixel may be determined based on the estimate luminance data and be adjusted by the weighted average derived from effective pixels. In one exemplary embodiment, for example, the luminance data of the supplement pixel may be determined as a median value of the estimate luminance data and the weighted average.

Chrominance data of the original pixels may be derived from the input image data (S245), and chrominance data of the supplement pixel may be calculated based on the chrominance data of the original pixels (S250). A data format of image data (e.g., data including the luminance data and the chrominance data) of the supplement pixel may be converted from the converted image format to the RGB format to generate output image data (S255).

Figure 6:
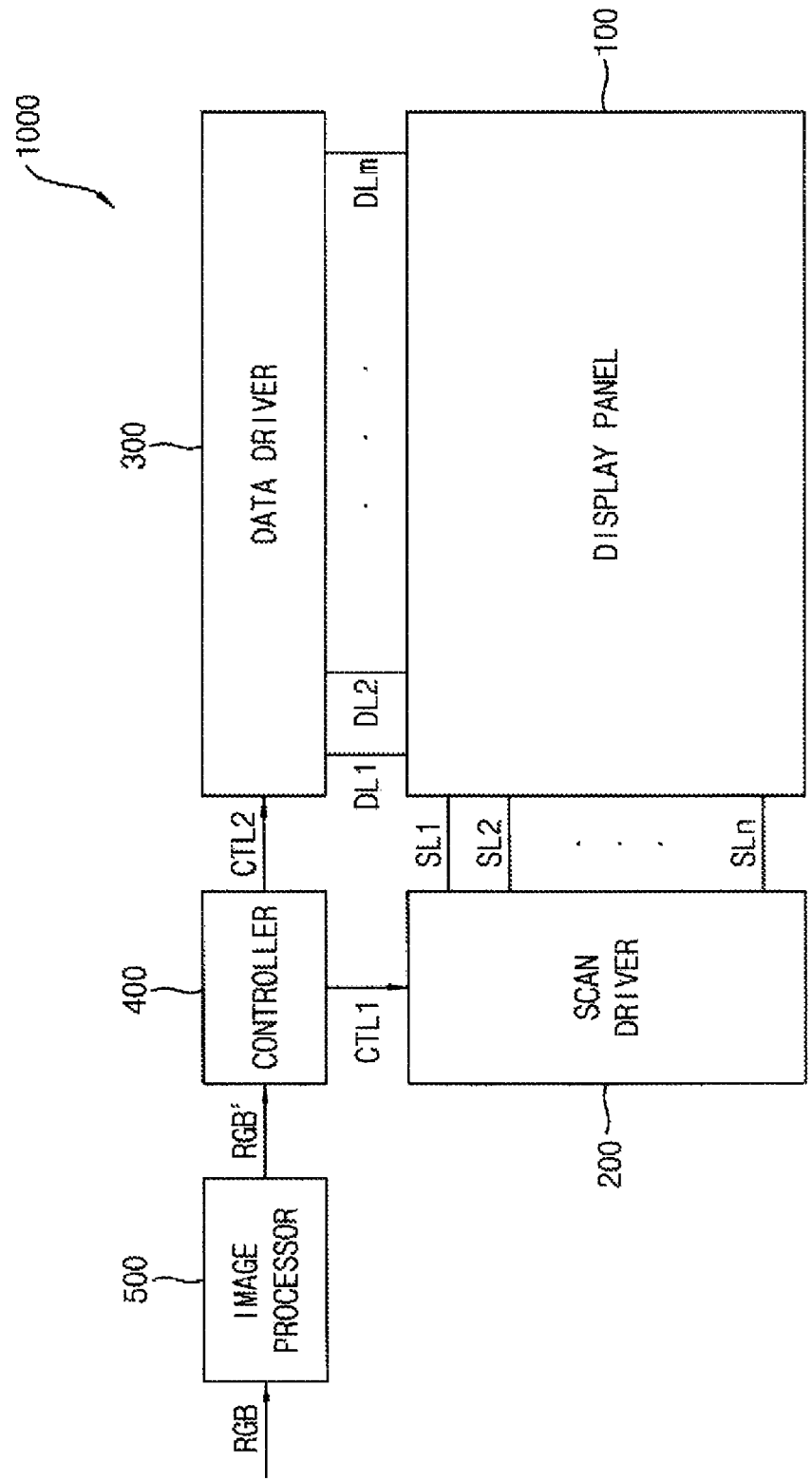
FIG. 6 is a block diagram illustrating an exemplary embodiment of a display device according to the invention.

FIG. 6 is a block diagram illustrating an exemplary embodiment of a display device according to the invention.

Referring to FIG. 6, an exemplary embodiment of the display device 1000 may include a display panel 100, a scan driver 200, a data driver 300, a controller 400, and an image processor 500.

The display panel 100 may include a plurality of pixels to display an image. In one exemplary embodiment, for example, the display panel 100 may include a plurality of pixels in a matrix form, e.g., n×m matrix. In such an embodiment, the pixels may be arranged at locations corresponding to crossing points of the scan lines SL1 through SLn and the data lines DL1 through DLm.

The scan driver 200 may provide a scan signal to the pixels via the scan lines SL1 through SLn based on the first control signal CTL1.

The data driver 300 may provide a data signal to the pixels via the data lines DL1 through DLm based on the second control signal CTL2.

The controller 400 may control the scan driver 200 and the data driver 300 to display an image corresponding to output image data.

The image processor 500 may generate the output image data by scaling input image data. The image processor 500 may select effective pixels based on a difference value among luminance data of original pixels adjacent to a supplement pixel and calculate weighted values of the effective pixels to scaling the input image data. The image processor 500 will be described later in greater detail with reference to the FIGS. 7 and 8.

The display device 1000 may select the effective pixels among original pixels adjacent to the supplement pixel to scale the input image data, thereby processing the input image data using two line memories. Therefore, the display device 1000 may improve the display quality in a device having limited hardware resources, e.g., a mobile device.

Figure 7:
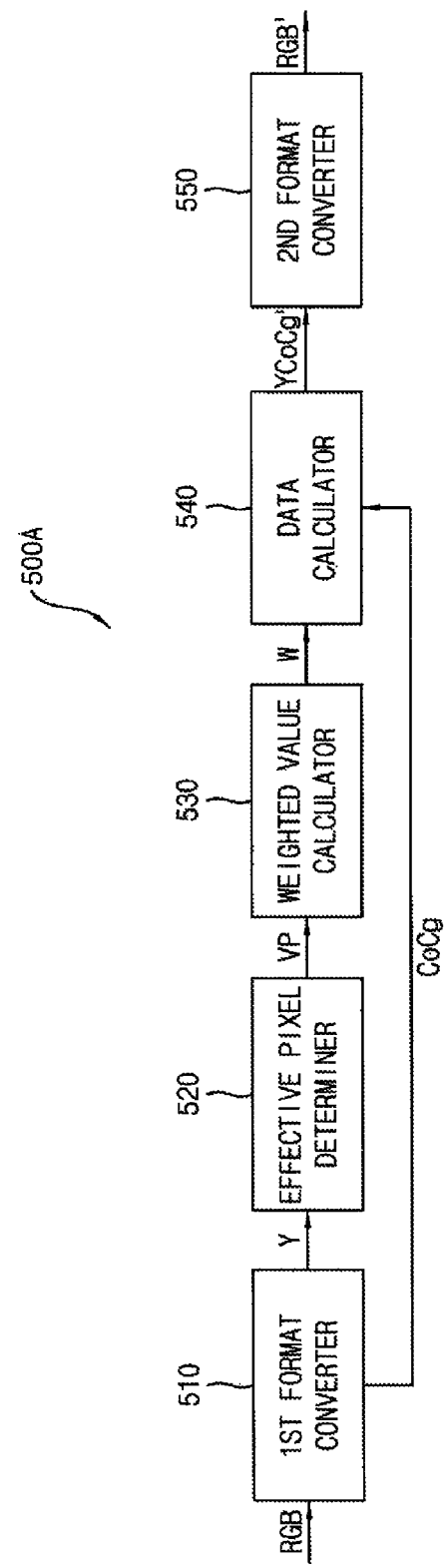
FIG. 7 is a block diagram illustrating an exemplary embodiment of an image processor of a display device shown in FIG. 6.

FIG. 7 is a block diagram illustrating an exemplary embodiment of an image processor of the display device shown in FIG. 6.

Referring to FIG. 7, an exemplary embodiment of the image processor 500A may include a first format converter 510, an effective pixel determiner 520, a weighted value calculator 530, a data calculator 540, and a second format converter 550.

The first format converter 510 may convert a data format of the input image data from a RGB format to a converted image format. In such an embodiment, the converted image format allows luminance data Y and chrominance data to be separated from each other. When the data format of the input image data is converted to the converted image format, luminance data and chrominance data of the original pixel may be derived without additional operation. In one exemplary embodiment, for example, the converted image format may be YCoCg format or YCbCr format The effective pixel determiner 520 may determine a supplement pixel and a plurality of original pixels. Thus, the effective pixel determiner 520 may determine the supplement pixel of which data is generated by scaling input image data and the original pixels of which data correspond to the input image data may be determined. The effective pixel determiner 520 may determine locations of the supplement pixel and the original pixels adjacent to the supplement pixel to calculate a distance between the supplement pixel and the original pixel. In such an embodiment, the effective pixel determiner 520 may select effective pixels VP from the original pixels using the nearest original pixel of the supplement pixel and by comparing a difference value of luminance data Y of the nearest original pixel and the remaining original pixels with a predetermined threshold value. When the difference value between the luminance data Y of the original pixels is relatively large, the original pixels may be located at the border of the image. The blur phenomenon may appear when the input image data are scaled using the original pixels that are located in different image region based on the border of the image. Therefore, the effective pixel determiner 520 may improve the sharpness of the image by selecting the original pixels as the effective pixels when the difference value among the luminance data of the selected original pixels is smaller than the threshold value.

The weighted value calculator 530 may set the weighted value W of the effective pixel VP in inverse proportion to a distance between the supplement pixel and the effective pixel VP. Thus, the weighted value calculator 530 may set the weighted value of an effective pixel to a relatively large value when a distance between the effective pixel and the supplement pixel is relatively close. The weighted value calculator 530 may set a weighted value of an effective pixel to a relatively small value when a distance between the effective pixel and the supplement pixel is relatively far. In such an embodiment, the weighted value calculator 530 may set a sum of the weighted value to be 1 to set luminance data of the supplement pixel to a weighted average of the luminance data of the effective pixel.

The data calculator 540 may calculate luminance data of the supplement pixel based on the luminance data of the effective pixel and the weighted value W. In one exemplary embodiment, for example, the data calculator 540 may calculate the luminance data of the supplement pixel as a weighted average of the luminance data of the effective pixels and the weighted values W. Therefore, the data calculator 540 may calculate the luminance data of the supplement pixel using only effective pixels among the original pixels adjacent the supplement pixel.

The data calculator 540 may calculate the chrominance data of the supplement pixel by a bilinear interpolation manner using the chrominance data CoCg of the original pixels. Generally, variation of chrominance data may be recognized by a user less than variation of luminance data. Therefore, the data calculator 540 may calculate the chrominance data of the supplement pixel AP using a simple algorithm to reduce load of the data calculator 540. In one exemplary embodiment, for example, the data calculator 540 may calculate the chrominance data of the supplement pixel by a bilinear interpolation manner using the chrominance data of the original pixels. When the chrominance data of the supplement pixel are calculated by the bilinear interpolation, jaggy phenomenon appearing in border of image may be improved. In an alternative exemplary embodiment, the data calculator 540 may set the chrominance data CoCg' of the supplement pixel to chrominance data of the nearest original pixel to the supplement pixel among the original pixels.

The second format converter 550 may convert a data format of image data (e.g., data including the luminance data and the chrominance data) of the supplement pixel from the converted image format to the RGB format, to generate output image data RGB'. Thus, the second format converter 550 may convert the scaled input image data of which data format is the converted image format into output image data of which data format is the RGB format.

Figure 8:
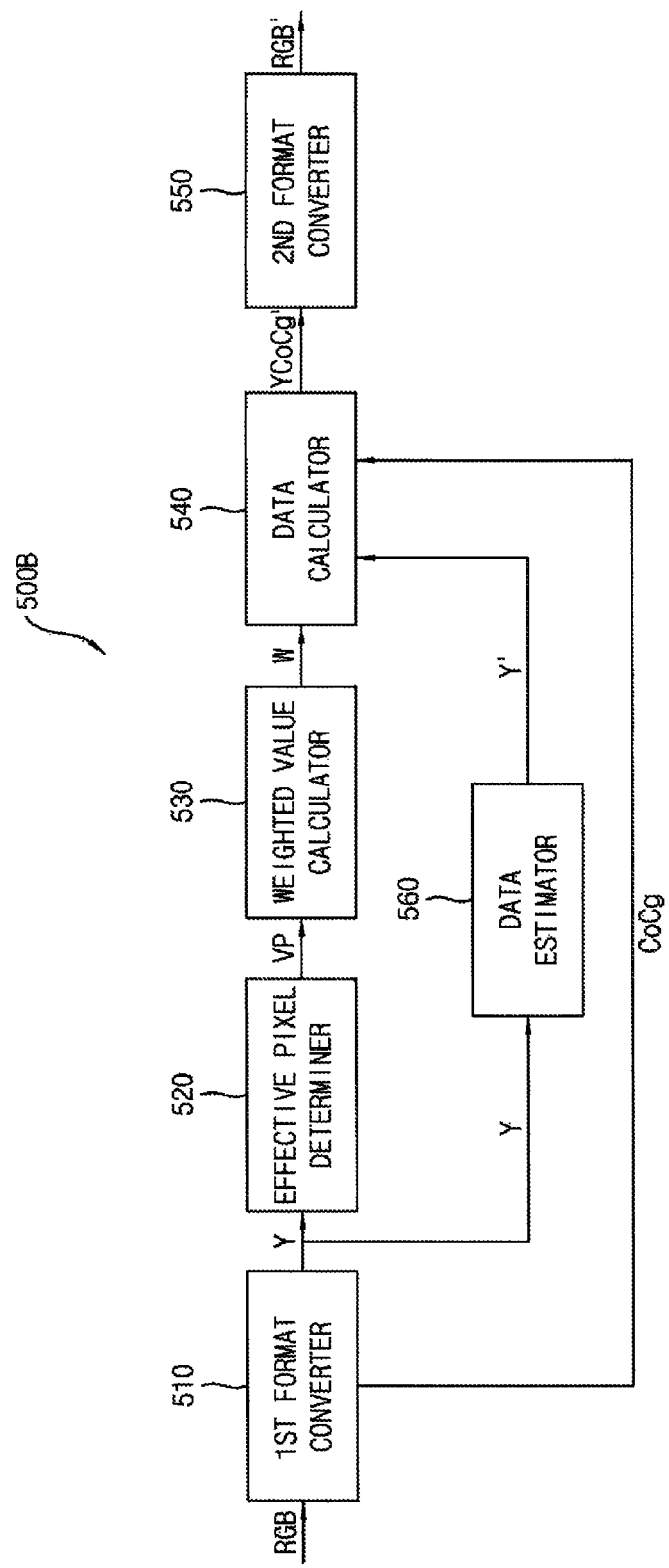
FIG. 8 is a block diagram illustrating an alternative exemplary embodiment of an image processor of a display device shown in FIG. 6.

FIG. 8 is a block diagram illustrating an alternative exemplary embodiment of an image processor of a display device shown in FIG. 6.

Referring to FIG. 8, an exemplary embodiment of the image processor 500B may include a first format converter 510, an effective pixel determiner 520, a weighted value calculator 530, a data calculator 540, a second format converter 550, and a data estimator 560. Such an embodiment of the image processor 500B is substantially the same as the exemplary embodiments of the image processor described above with reference to FIG. 7, except that the data estimator 560 is added. The same or like elements shown in FIG. 8 have been labeled with the same reference characters as used above to describe the exemplary embodiments of the he image processor shown in FIG. 7, and any repetitive detailed description thereof will be omitted.

In an exemplary embodiment, the first format converter 510 may convert a data format of the input image data from a RGB format to a converted image format in which luminance data Y and chrominance data are separated from each other.

The effective pixel determiner 520 may determine a supplement pixel and a plurality of original pixels. In such an embodiment, the effective pixel determiner 520 may select effective pixels VP from the original pixels when a difference value among luminance data Y of the original pixels is smaller than a predetermined threshold value.

The weighted value calculator 530 may set weighted values W of the effective pixels VP in inverse proportion to a distance between the supplement pixel and the effective pixels VP.

The data estimator 560 may derive estimate luminance data Y' of the supplement pixel based on the luminance data Y of the original pixels. Thus, the data estimator 560 may derive the estimate luminance data Y' of the supplement pixel based on luminance data of all of the original pixels adjacent to the supplement pixel. The estimate luminance data may be used for calculating luminance data of the supplement pixel. The data estimator 560 may calculate the estimate luminance data using a relatively simple algorithm. In one exemplary embodiment, for example, the data estimator 560 may calculate the estimate luminance data Y' by a bilinear interpolation manner using the luminance data of the original pixels. In an alternative exemplary embodiment, the data estimator 560 may set the estimate luminance data Y' to luminance data of the nearest original pixel to the supplement pixel among the original pixels.

The data calculator 540 may determine the luminance data of the supplement pixel as a value in a range from a weighted average of the luminance data of the effective pixel based on the weighted values W to the estimate luminance data Y'. Thus, the data calculator 540 may determine the luminance data of the supplement pixel based on the estimate luminance data and adjust the luminance data of the supplement pixel by the weighted average derived from effective pixels. In one exemplary embodiment, for example, the data calculator 540 may set the luminance data of the supplement pixel to a median value of the estimate luminance data Y' and the weighted average. In such an embodiment, the data calculator 540 may calculate the chrominance data CoCg' of the supplement pixel by a bilinear interpolation manner using the chrominance data CoCg of the original pixels.

The second format converter 550 may convert a data format of image data (e.g., data including the luminance data and the chrominance data) of the supplement pixel from the converted image format to the RGB format, to generate output image data RGB'. Thus, the second format converter 550 may convert the scaled input image data of which data format is the converted image format into output image data of which data format is the RGB format.

In an exemplary embodiment, the image processor may be included in the display device, but not being limited thereto. In an alternative exemplary embodiment, the image processor may be located outside of the display device.

The inventive concept may be applied to an electronic device including the display device. Exemplary embodiments of The inventive concept may be applied to a cellular phone, a smart phone, a smart pad, a personal digital assistant ("PDA"), etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of image processing, the method comprising:
   determining a supplement pixel of which data is generated by scaling input image data and a plurality of original pixels of which data correspond to the input image data, wherein the original pixels are adjacent to the supplement pixel;
   deriving luminance data of the original pixels from the input image data;
   calculating a difference value among luminance data of the original pixels;
   selecting an original pixel among the original pixels as an effective pixel when a difference value of luminance data of the original pixel and a nearest original pixel to the supplement pixel among the original pixels is smaller than a predetermined threshold value;
   setting a weighted value of the effective pixel based on a distance between the supplement pixel and the effective pixel; and
   calculating luminance data of the supplement pixel based on luminance data of the effective pixel and the weighted value.

2. The method of claim 1, wherein the weighted value is determined in inverse proportion to the distance between the supplement pixel and the effective pixel.

3. The method of claim 2, wherein a sum of the weighted value is 1.

4. The method of claim 1, wherein the luminance data of the supplement pixel is determined as a weighted average of the luminance data of the effective pixel based on the weighted value.

5. The method of claim 1, further comprising:
   converting a data format of the input image data from a RGB format to a converted image format in which luminance data and chrominance data are separated from each other.

6. The method of claim 5, wherein the converted image format is YCoCg format or YCbCr format.

7. The method of claim 5, further comprising:
   deriving chrominance data of the original pixels from the input image data; and
   calculating chrominance data of the supplement pixel based on the chrominance data of the original pixels.

8. The method of claim 7, wherein the chrominance data of the supplement pixel is calculated by a bilinear interpolation manner using the chrominance data of the original pixels.

9. The method of claim 7, wherein the chrominance data of the supplement pixel is determined as chrominance data of the nearest original pixel to the supplement pixel among the original pixels.

10. The method of claim 7, further comprising:
    converting a data format of image data of the supplement pixel from the converted image format to the RGB format to generate output image data.

11. The method of claim 1, further comprising:
    deriving estimate luminance data of the supplement pixel based on the luminance data of the original pixels,
    wherein the luminance data of the supplement pixel is determined as a value in a range from a weighted average of the luminance data of the effective pixel based on the weighted value to the estimate luminance data.

12. The method of claim 11, wherein the estimate luminance data is calculated by a bilinear interpolation manner using the luminance data of the original pixels.

13. The method of claim 11, wherein the estimate luminance data is determined as luminance data of the nearest original pixel to the supplement pixel among the original pixels.

14. An image processor comprising:
    an effective pixel determiner which determines a supplement pixel of which data is generated by scaling input image data and a plurality of original pixels of which data correspond to the input image data, wherein the original pixels are adjacent to the supplement pixel, and the effective pixel determiner selects an original pixel among the original pixels as an effective pixel when a difference value of luminance data of the original pixel and a nearest original pixel to the supplement pixel among the original pixels is smaller than a predetermined threshold value;
    a weighted value calculator which sets a weighted value of the effective pixel in inverse proportion to a distance between the supplement pixel and the effective pixel; and
    a data calculator which calculates luminance data of the supplement pixel based on the luminance data of the effective pixel and the weighted value.

15. The image processor of claim 14, further comprising:
    a first format converter which converts a data format of the input image data from a RGB format to a converted image format in which luminance data and chrominance data are separated from each other; and
    a second format converter which converts a data format of image data of the supplement pixel from the converted image format to the RGB format.

16. The image processor of claim 14, wherein the data calculator calculates the luminance data of the supplement pixel as a weighted average of the luminance data of the effective pixel based on the weighted value.

17. The image processor of claim 14, wherein the data calculator calculates the chrominance data of the supplement pixel by a bilinear interpolation manner using the chrominance data of the original pixels.

18. The image processor of claim 14, further comprising:
    a data estimator which derives estimate luminance data of the supplement pixel based on the luminance data of the original pixels,
    wherein the data calculator determines the luminance data of the supplement pixel as a value in a range from a weighted average of the luminance data of the effective pixel based on the weighted value to the estimate luminance data.

19. The image processor of claim 14, wherein the converted image format is YCoCg format or YCbCr format.

20. A display device comprising:
    a display panel comprising a plurality of pixels;
    a scan driver which provides a scan signal to the pixels;

a data driver which provides a data signal to the pixels;
an image processor which generates output image data by scaling input image data; and
a controller which controls the scan driver and the data driver to display an image corresponding to the output image data,
wherein the image processor comprises:
  an effective pixel determiner which determines a supplement pixel of which data is generated by scaling the input image data and a plurality of original pixels of which data correspond to the input image data, wherein the original pixels are adjacent to the supplement pixel, and the effective pixel determiner selects an original pixel among the original pixels as an effective pixel when a difference value of luminance data of the original pixel and a nearest original pixel to the supplement pixel among the original pixels is smaller than a predetermined threshold value;
  a weighted value calculator which sets a weighted value of the effective pixel in inverse proportion to a distance between the supplement pixel and the effective pixel; and
  a data calculator which calculates luminance data of the supplement pixel based on the luminance data of the effective pixel and the weighted value.

* * * * *